(12) United States Patent
Giraud et al.

(10) Patent No.: US 9,383,538 B2
(45) Date of Patent: Jul. 5, 2016

(54) OPTICAL CABLE SPLICE CASSETTES WITH DEVICE HOLDER

(71) Applicant: CORNING OPTICAL COMMUNICATIONS LLC, Hickory, NC (US)

(72) Inventors: William Julius McPhil Giraud, Azle, TX (US); Diana Rodriguez, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/281,938

(22) Filed: May 20, 2014

(65) Prior Publication Data
US 2014/0348479 A1 Nov. 27, 2014

Related U.S. Application Data

(60) Provisional application No. 61/825,758, filed on May 21, 2013.

(51) Int. Cl.
*G02B 6/44* (2006.01)

(52) U.S. Cl.
CPC ............ *G02B 6/4454* (2013.01); *G02B 6/4452* (2013.01); *G02B 6/4453* (2013.01); *G02B 6/4455* (2013.01)

(58) Field of Classification Search
CPC .. G02B 6/4452; G02B 6/4453; G02B 6/4454; G02B 6/4455
See application file for complete search history.

(56) References Cited

U.S. PATENT DOCUMENTS

| 5,519,804 | A | 5/1996 | Burek et al. | |
|---|---|---|---|---|
| 7,418,184 | B1 | 8/2008 | Gonzales et al. | |
| 8,374,477 | B2 | 2/2013 | Hill | 385/135 |
| 2002/0051616 | A1* | 5/2002 | Battey et al. | 385/135 |
| 2009/0245743 | A1 | 10/2009 | Cote et al. | |
| 2010/0142910 | A1* | 6/2010 | Hill et al. | 385/135 |
| 2010/0290751 | A1* | 11/2010 | Naudin et al. | 385/135 |
| 2011/0211799 | A1* | 9/2011 | Conner et al. | 385/135 |
| 2011/0268415 | A1* | 11/2011 | Fabrykowski et al. | 385/135 |

(Continued)

FOREIGN PATENT DOCUMENTS

EP 0216073 A1 4/1987

OTHER PUBLICATIONS

Patent Cooperation Treaty, International Search Report for PCT/US2014/037842, Mail date Sep. 10, 2014, 5 pages.

*Primary Examiner* — Eric Wong
*Assistant Examiner* — Mary A El Shammaa
(74) *Attorney, Agent, or Firm* — Brad Christopher Rametta

(57) ABSTRACT

Splice cassettes for optical cables and optical devices may include a tray base having a tray top surface. A tray center portion may be defined on the tray top surface inside a plurality of tray cable securing members arranged around a center-portion periphery of the tray center portion with a tray proximal zone and a tray distal zone. A device holder may be removably and hingedly attached to the tray base. An inner surface of the holder may have a holder proximal zone in which at least one device securing member may be disposed and configured to secure an optical device to the inner surface. When the device holder is closed and an optical device is secured in the at least one device securing member of the device holder, the holder distal zone may overlie the tray distal zone and the optical device may overlie the tray proximal zone.

12 Claims, 11 Drawing Sheets

(56) References Cited

U.S. PATENT DOCUMENTS

| | | | |
|---|---|---|---|
| 2012/0051707 A1* | 3/2012 | Barnes et al. | 385/135 |
| 2012/0134639 A1* | 5/2012 | Giraud et al. | 385/135 |
| 2013/0028567 A1* | 1/2013 | Parikh et al. | 385/135 |
| 2013/0034333 A1 | 2/2013 | Holmberg et al. | |

* cited by examiner

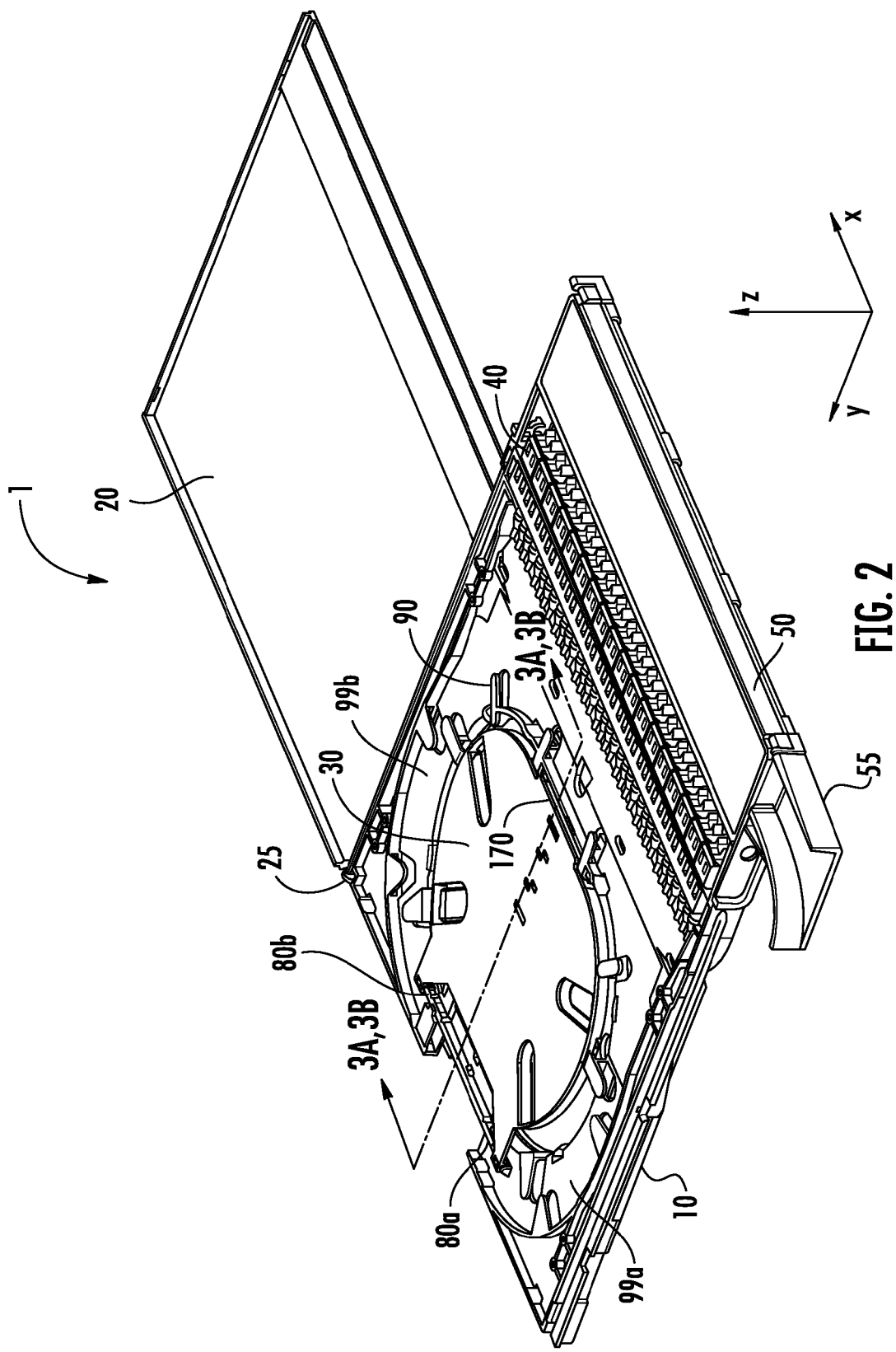

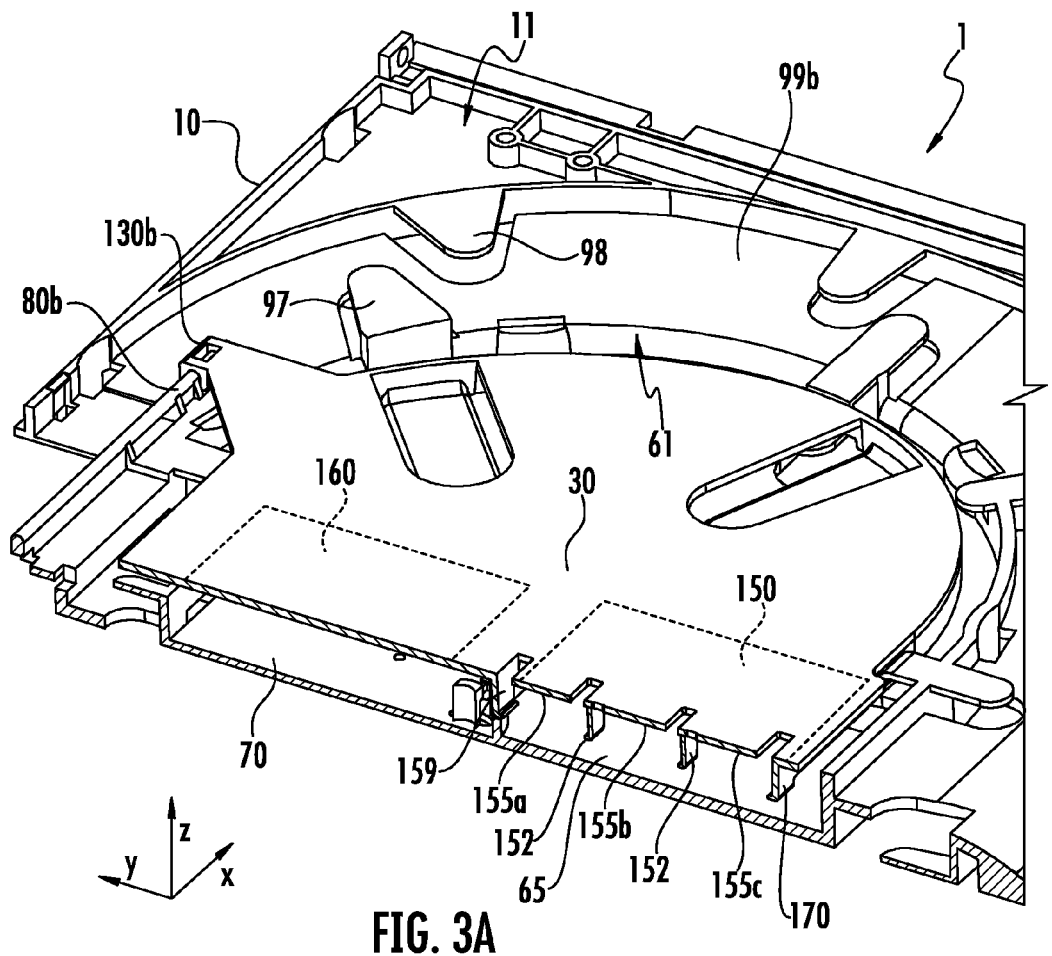
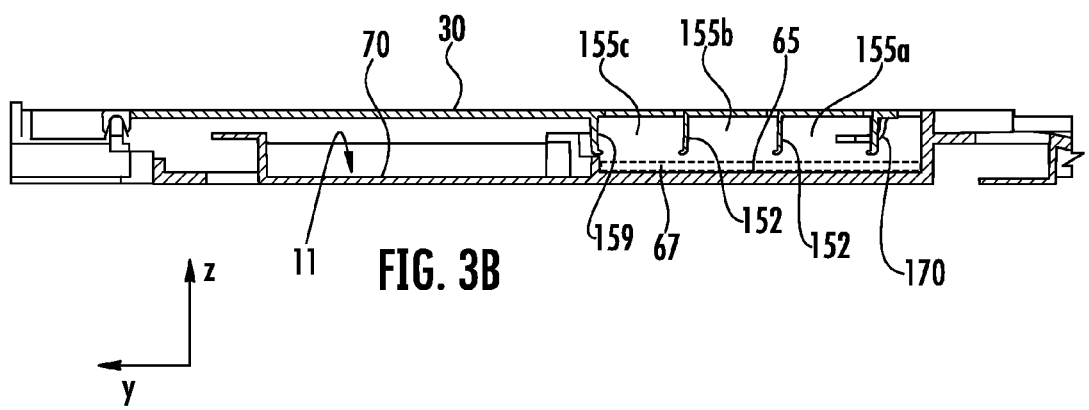

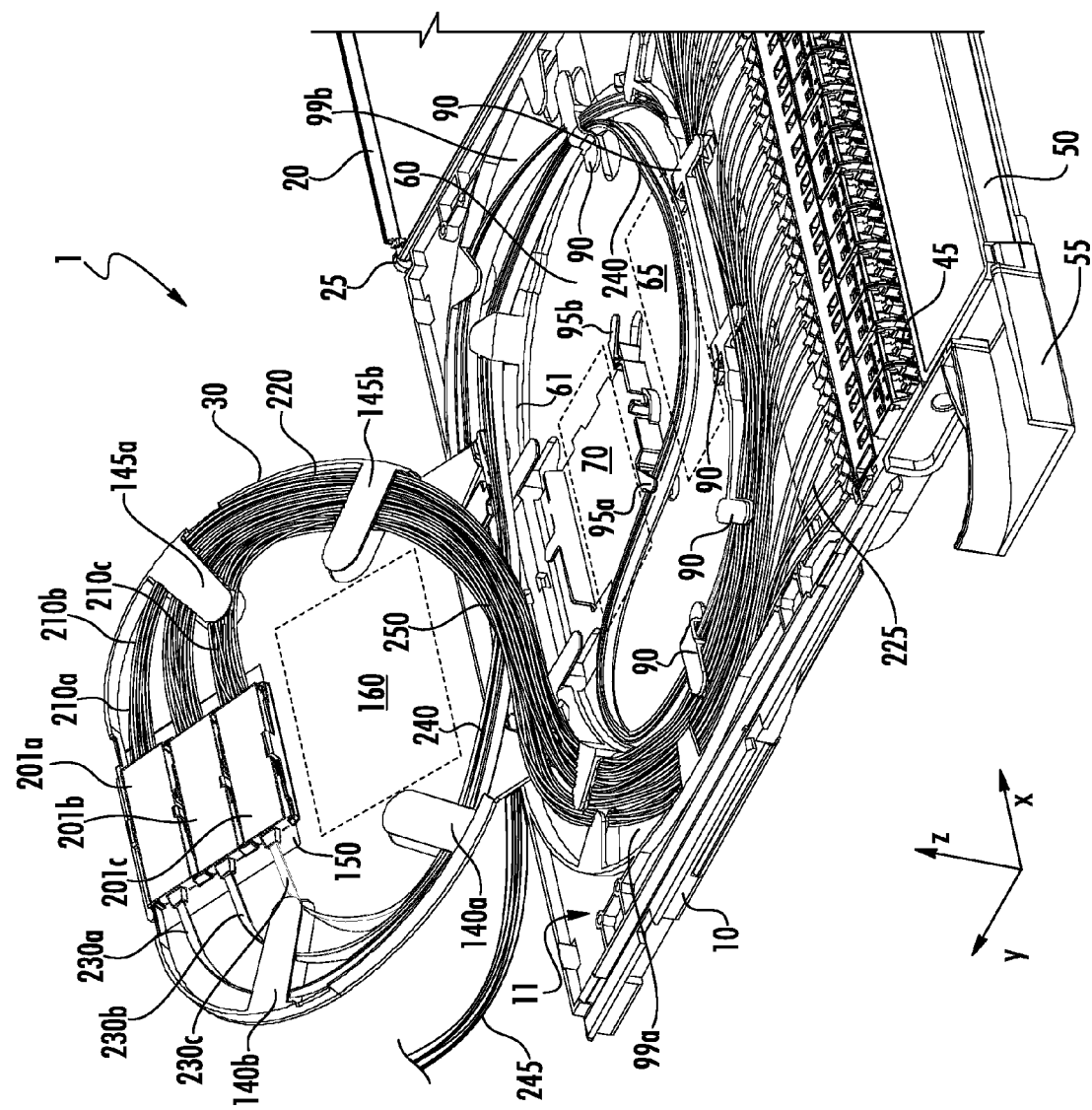

OPTICAL CABLE SPLICE CASSETTES WITH DEVICE HOLDER

RELATED APPLICATIONS

This application claims the benefit of priority under 35 U.S.C. §119 of U.S. Provisional Application No. 61/825,758 filed on May 21, 2013, the content of which is relied upon and incorporated herein by reference in its entirety.

BACKGROUND

1. Field of the Disclosure

The disclosure relates generally to optical cable apparatus more particularly to splice cassettes that may be used in network equipment including optical cables.

2. Technical Background

In optical cable networking apparatus including convergence points and distribution frames, such as in fiber-optics networking, there is a constant demand for apparatus permitting high-density distribution with very high fiber termination counts in a small, confined volume. To accomplish the high-density distribution with high fiber termination counts requires efficient utilization of space with due regard to constraints put on optical cables such as minimum bending radius. As such, ongoing needs exist to optical-cable networking apparatus that can effectively utilize a confined volume and/or increase cable storage capacity when large numbers of optical cables are present, while simultaneously avoiding sharp bends to the optical cables.

No admission is made that any reference cited herein constitutes prior art. The Applicants expressly reserve the right to challenge the accuracy and pertinence of any cited documents.

SUMMARY

Some embodiments of the disclosure relate to splice cassettes for optical cables and optical devices. The splice cassettes may include a tray base having a tray top surface. A tray center portion may be defined on the tray top surface inside a plurality of tray cable securing members arranged around a center-portion periphery of the tray center portion. The tray center portion may have a tray proximal zone and a tray distal zone defined thereon. The splice cassette may further include a device holder removably and hingedly attached to the tray base and having a holder-closed position and a holder-open position. The device holder may include a holder inner surface and a holder outer surface opposite the holder inner surface. The holder inner surface may have a holder proximal zone and a holder distal zone defined thereon. The device holder may include a plurality of holder cable securing members arranged around a holder periphery of the device holder. At least one device securing member may be disposed in the holder proximal zone and configured to secure an optical device to the holder inner surface. When the device holder is in the holder-closed position and an optical device is secured in the at least one device securing member of the device holder, the holder distal zone overlies the tray distal zone and the optical device overlies the tray proximal zone.

Additional embodiments of the disclosure also relate to splice cassettes for optical cables and optical devices. The splice cassettes according to such embodiments may include a tray base having a tray top surface. A tray center portion may be defined on the tray top surface inside a plurality of tray cable securing members arranged around a center-portion periphery of the tray center portion. The tray center portion may have a tray proximal zone and a tray distal zone defined thereon. The splice cassettes may further include a device holder hingedly attached to the tray base. The device holder may have a holder-closed position and a holder-open position. The device holder may include a holder inner surface and a holder outer surface opposite the holder inner surface. The holder inner surface may have a holder proximal zone and a holder distal zone defined thereon. The device holder may also include at least one first holder cable securing member arranged around a first side of a holder periphery of the holder inner surface and at least one second holder cable securing member arranged around a second side of the holder periphery of the holder inner surface opposite the first side of the holder periphery. The device holder may also include at least one device securing member disposed in the holder proximal zone of the holder inner surface. Thereby, an optical device may be secured to the device holder by the at least one device securing member. At least one first cable may be connected to a first side of the optical device adjacent to the first side of the holder periphery, and at least one second cable may be connected to a second side of the optical device adjacent to the second side of the holder periphery. In the splice cassette, the at least one first cable may be routed from the first side of the optical device, through the at least one first holder cable securing member, to a first tray cable securing member on the tray top surface. Likewise, the at least one second cable may be routed from the second side of the optical device, through the at least one second holder cable securing member, to a second tray cable securing member on the tray top surface. The at least one first cable and the at least one second cable may be routed such that between the first holder cable securing member and the first tray cable securing member, the at least one first cable crosses the at least one second cable.

Additional features and advantages will be set forth in the detailed description which follows, and in part should be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 2 is a perspective view of the splice cassette of FIG. 1, showing the device holder attached to the tray base in a holder-closed position and an optional tray cover in a cover-open position;

FIG. 3A is a cut-away view of the splice cassette of FIG. 2;

FIG. 3B is a side elevation of the splice cassette of FIG. 3A;

FIG. 11 is a perspective view of a splice cassette according to embodiments herein, showing an exemplary cable routing and fan-out bodies secured to a device holder.

Figure 1:
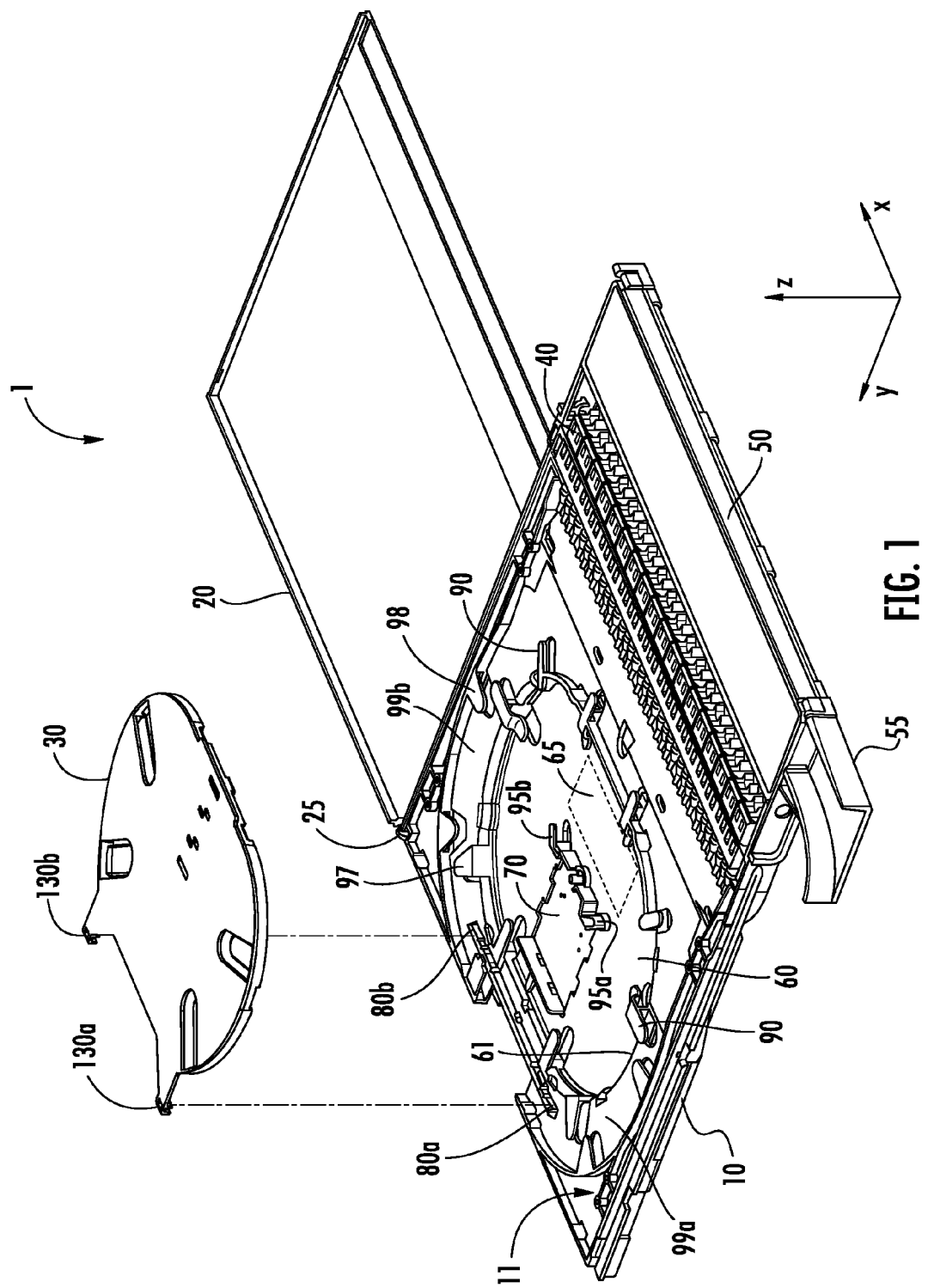
FIG. 1 is a perspective view of a splice cassette tray base and a device holder according to some embodiments described herein.

Cartesian axes are shown in the figures for the sake of reference only and are not intended to be limiting with respect to direction or orientation. Additionally, for sake of reference only and not by way of limitation, the Cartesian axes shown in the figures include arrows that consistently define a particular direction with respect to each axis in all figures that depict the same object in different orientations. Throughout this disclosure, relational terms will be used by a convention in view of the Cartesian axes of the figures and the positive directions indicated by the arrows. According to the convention, relationships relative to the x-axis of any object may be expressed using terms such as left, right, to the left of, or to the right of According to the convention, relationships relative to the y-axis of any object may be expressed using terms such as front, back, in front of or proximal to, or behind or distal to. According to the convention, relationships relative to the z-axis of any object may be expressed using terms such as top, bottom, above, below, over, or under. Neither the convention nor the terms used to express various relationships are intended to limit any object or component thereof to a direction or orientation in construction or in use.

DETAILED DESCRIPTION

Embodiments of splice cassettes for optical cables and optical devices will now be described with reference to the figures. Referring to FIGS. 1-3 and 11, a splice cassette 1 may include a tray base 10 having a tray top surface 11. A tray center portion 60 may be defined on the tray top surface 11 inside a plurality of tray cable securing members 90 arranged around a center-portion periphery 61 of the tray center portion 60. The tray center portion 60 may have a tray proximal zone 65 and a tray distal zone 70 defined thereon. The splice cassette 1 may further include a device holder 30 removably and hingedly attached to the tray base 10 and having a holder-closed position and a holder-open position. The device holder 30 may include a holder inner surface 110 and a holder outer surface 120 opposite the holder inner surface 110. The holder inner surface 110 may have a holder proximal zone 150 and a holder distal zone 160 defined thereon. The device holder 30 may include a plurality of holder cable securing members 140a, 140b, 145a, 145b arranged around a holder periphery 180 of the device holder 30. At least one device securing member (152, for example) may be disposed in the holder proximal zone 150 and configured to secure an optical device (fan-out body 201a, for example) to the holder inner surface 110. When the device holder 30 is in the holder-closed position and an optical device is secured in the at least one device securing member of the device holder 30, the holder distal zone 160 overlies the tray distal zone 70 and the optical device overlies the tray proximal zone 65.

In some embodiments the splice cassette 1 may contain one or more additional features shown in the figures. For example, referring to FIG. 1, the splice cassette 1 may include an adapter bank 40 that includes a plurality of adapters for connecting external devices (not shown) to optical cables within the splice cassette 1. As another example of an additional feature, the splice cassette 1 may include a drop handle 50 having a cable guidance end 55. The drop handle 50 may cover the adapter panel 40 when the adapter panel 40 is not in use or may protect connectors that are plugged into the adapter panel 40 when the adapter panel 40 is in use. The drop handle 50 also may include a pivot or hinge that allows the drop handle 50 to swing up and down to provide access to the adapter panel 40.

As another example of an additional feature, the splice cassette 1 may include a tray cover 20 hingedly attached to the tray base 10 on a side of the tray base 10 by a cover hinge 25, for example. In such embodiments, the tray cover 20 may be made of a transparent or translucent material that enables a technician to view connections and devices on the tray base through the tray cover 20.

Figure 4:
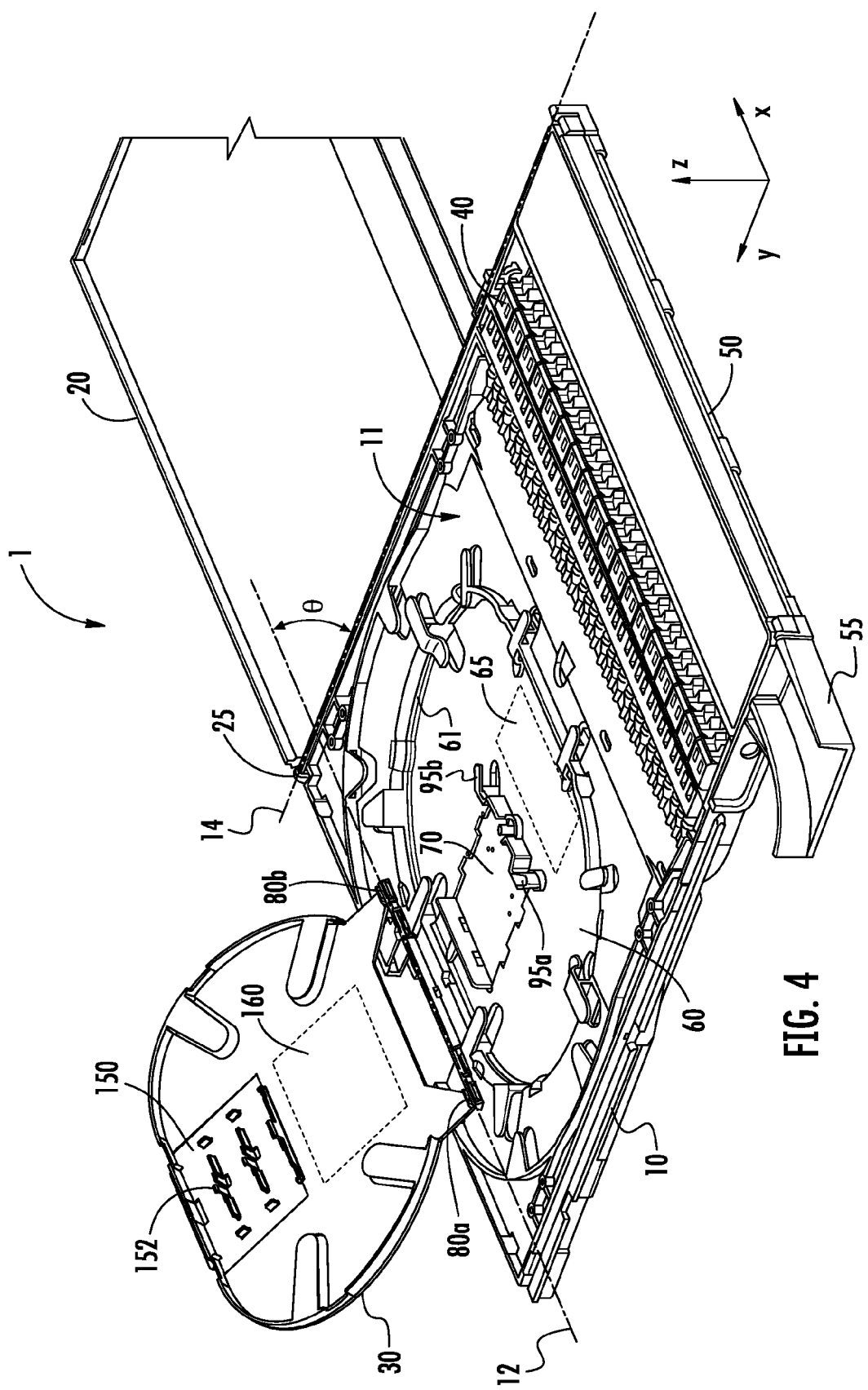
FIG. 4 is a perspective view of the splice cassette of FIG. 1, showing the device holder attached to the tray base in a holder-open position and the optional tray cover in a cover-open position.
Figure 5:
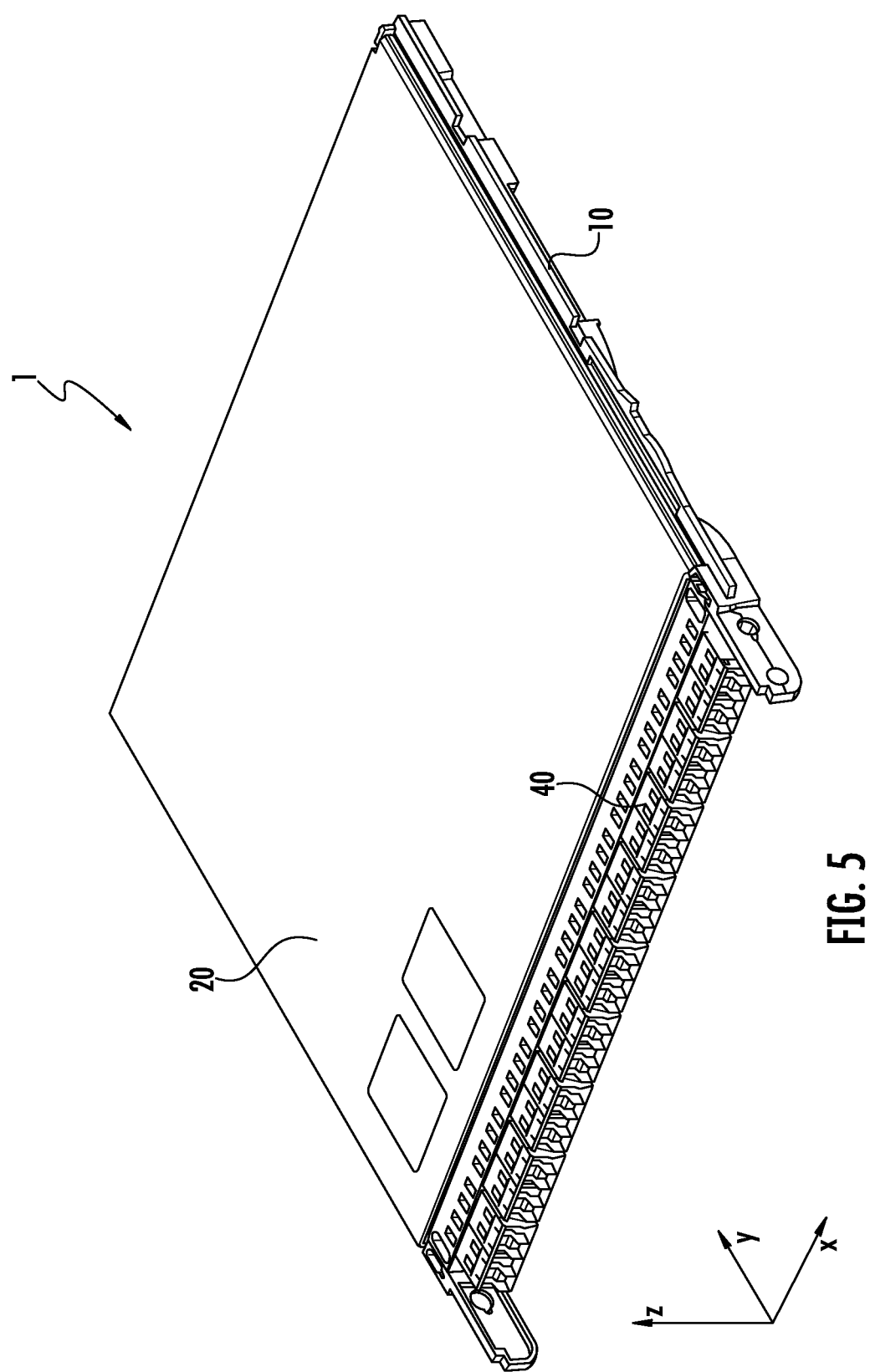
FIG. 5 is a perspective view of the splice cassette of FIG. 2, showing the device holder attached to the tray base in a holder-closed position and the optional tray cover in a cover-closed position overlying the device holder.

As noted above, in some embodiments the splice cassette 1 may include a tray cover 20 hingedly attached to the tray base 10. Thereby, the tray cover may have a cover-open position (as shown in FIGS. 1, 2, and 4) or a cover-closed position (as shown in FIG. 5). As illustrated in FIG. 4, the device holder 30 may close on a holder axis 12 of the tray base 10, and the tray cover 20 may close on a cover axis 14 of the tray base. The holder axis 12 and the cover axis 14 may be, but need not be, in the same plane, but when the holder axis 12 and the cover axis 14 are projected onto a plane parallel to the tray top surface 11, the holder axis 12 and the cover axis 14 may intersect at an angle θ. In some embodiments, the angle θ may be about 90°, such that the holder axis 12 is perpendicular or substantially perpendicular to the cover axis 14. In some embodiments, when the device holder 30 is in the holder-closed position and the tray cover 20 is in the tray-closed position, the device holder 30 is interposed between the tray top surface 11 and the tray cover 20.

Referring to FIGS. 1-4, the splice cassette 1 may include a tray base 10 having a tray top surface 11. The tray base 10 may be made of a rigid material such as a plastic or polymer and made be made by any suitable technique such as molding or pressing, for example. The tray base 10 may include a tray center portion 60 defined within a center-portion periphery 61. In some embodiments, the tray center portion 60 may be a depression in the center of the tray base 10, such that the center-portion periphery 61 is defined by outer walls of the depression. In other embodiments, the tray top surface 11, including the tray center portion 60, may be substantially planar, such that the center-portion periphery 61 may be defined by one or more raised features connected to the tray top surface 11.

The tray center portion 60 may be disposed within a plurality of tray cable securing members 90 arranged around the center-portion periphery 61. The plurality of tray cable securing members 90 may secure optical cables running within the tray center portion 60, optical cables running within a cable track 99a, 99b outside the tray center portion 60, or both. Cables running within the cable track 99a, 99b may also be secured by track cable securing members 97, 98. The tray cable securing members 90 and the track cable securing members 97, 98 may be any suitable structure that guides, catches, or secures optical cables, or that facilitates winding or wrapping of the optical cables along a predetermined pathway such as within the cable track 99a, 99b.

The tray center portion 60 of the tray top surface 11 may have a tray proximal zone 65 and a tray distal zone 70 defined thereon. In some embodiments, the tray proximal zone 65 may be separated from the tray distal zone 70 by center cable securing members 95a, 95b. The tray proximal zone 65 of the tray center portion 60 may configured to have a sufficient area and suitable geometry to fit optical devices secured to the device holder 30 when the device holder 30 is in a holder-closed position. The device holder 30 will now be described in greater detail.

Figure 7A:
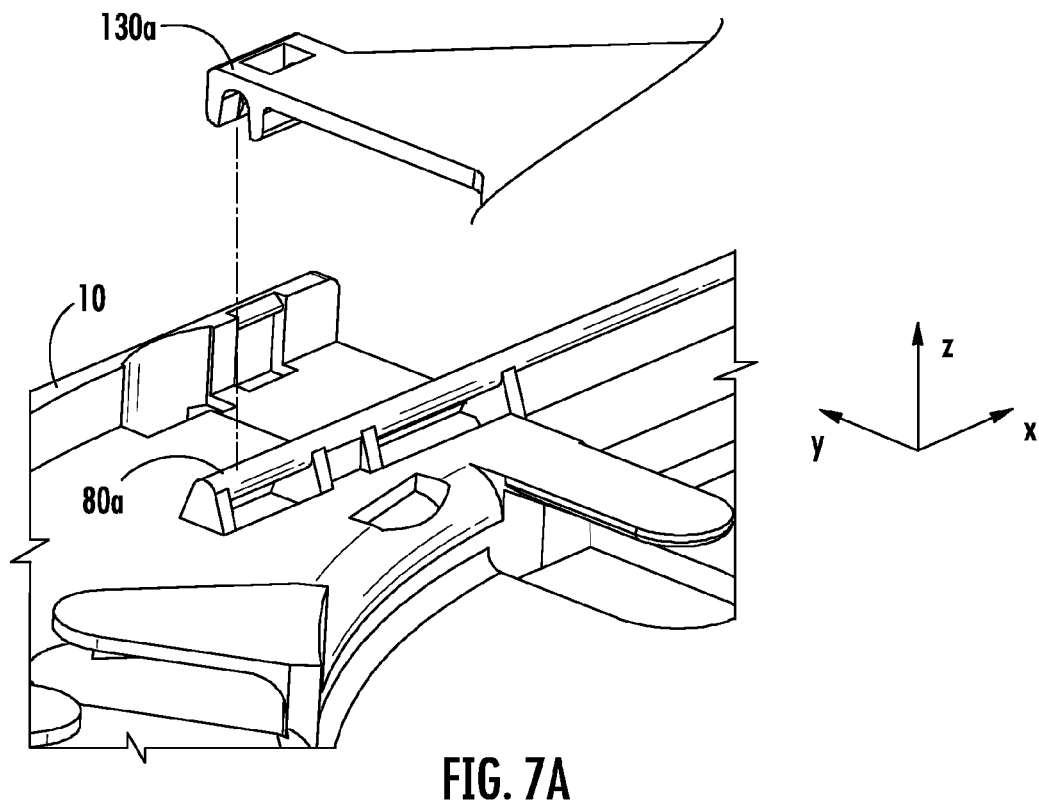
FIGS. 7A and 7B depict an exemplary embodiment of a hinge attachment of a device holder according to embodiments herein to the tray base of a splice cassette.
Figure 7B:
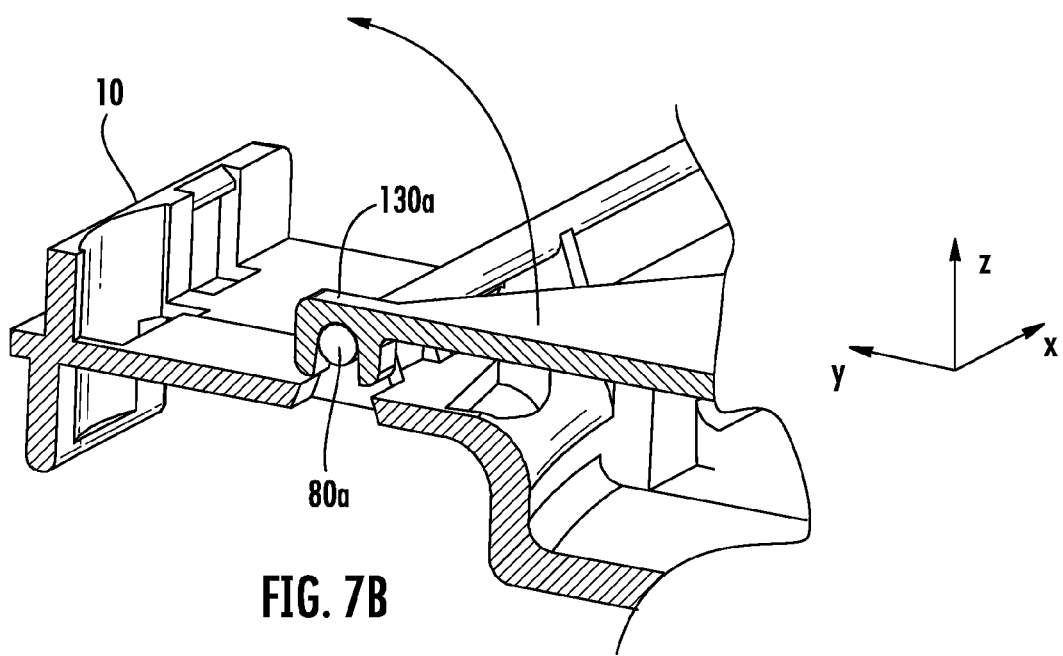

As described above, the splice cassette 1 may further include a device holder 30 removably and hingedly attached to the tray base 10. By nature of its hinged attachment to the tray base 10, the device holder 30 may have a holder-closed position (FIG. 2) and a holder-open position (FIG. 4). As shown in the embodiment of FIG. 1 and in greater detail in FIGS. 7A and 7B, the device holder 30 may include a first grasping member 130a that snaps on to a first receiving member 80a on the tray base 10. The device holder 30 may also include a second grasping member 130b that snaps on to a second receiving member 80b on the tray base 10. It should be readily apparent that numerous other configurations of a removable and hinged attachment of the device holder 30 to the tray base 10 are possible as alternative embodiments. For example, the device holder 30 may include only a single grasping member instead of a first grasping member 130a and the second grasping member 130b, and the tray base 10 may include only a single receiving member instead of the first receiving member 80a and the second receiving member 80b. As another example, the device holder 30 may include more than two grasping members and the tray base may include a corresponding number of receiving members. As another example, one or more grasping members may be present on the tray base 10 instead of on the device holder 30, and one or more suitable receiving members may be present on the device holder 30 instead of on the tray base 10.

Figure 6A:
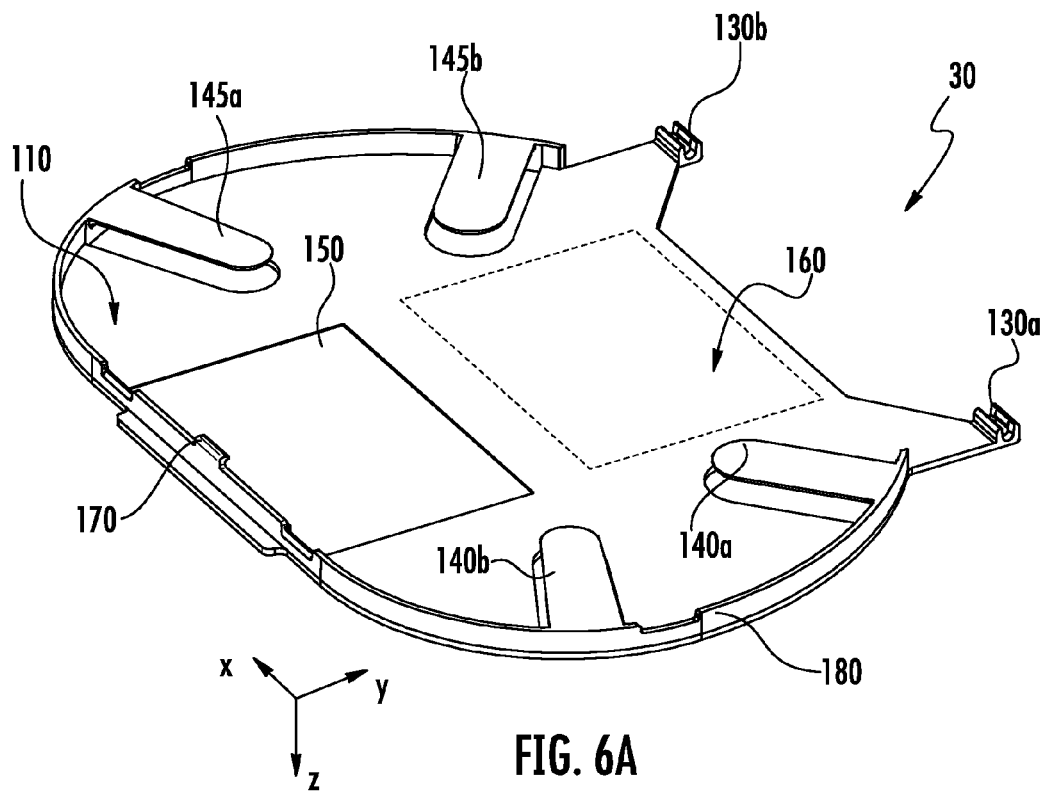
FIG. 6A is a bottom view of a device holder according to embodiments described herein, with device securing members removed to illustrate proximal and distal zones.
Figure 6B:
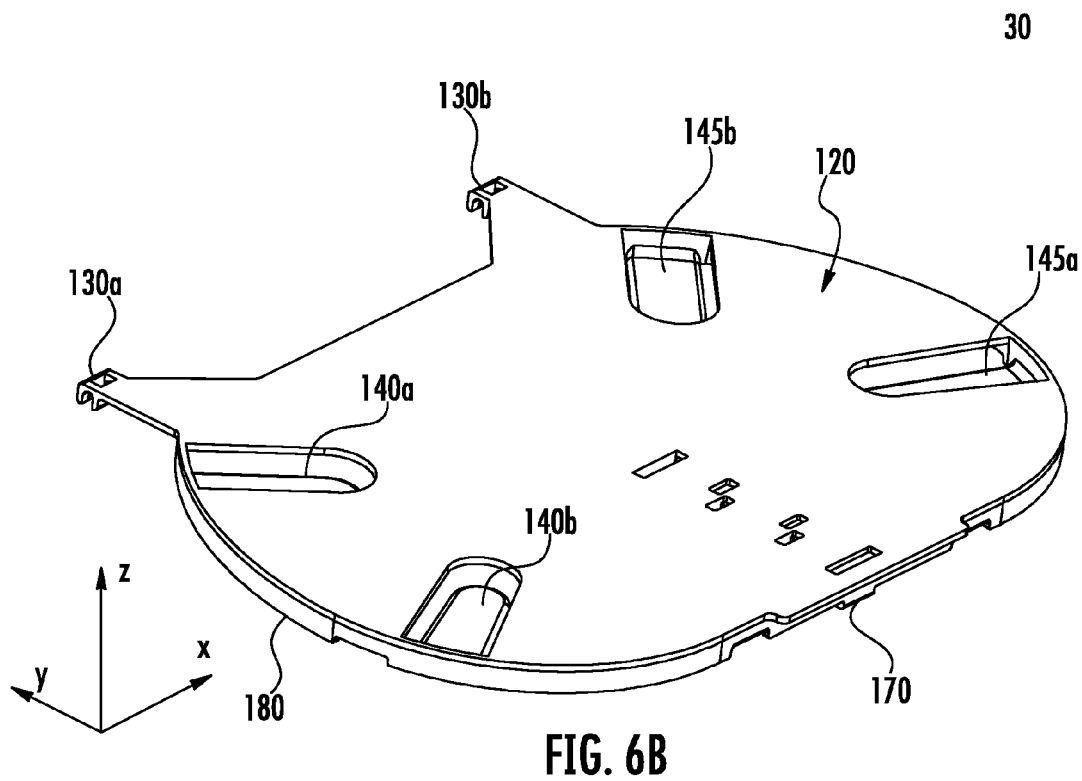
FIG. 6B is a top view of the device holder of FIG. 6A.

Referring to FIGS. 6A and 6B, the device holder 30 may include a holder inner surface 110 and a holder outer surface 120 opposite the holder inner surface 110. The holder inner surface 110 may have a holder proximal zone 150 and a holder distal zone 160 defined thereon. In the device holder of FIG. 6A, the holder proximal zone 150 is shown empty to illustrate its general position on the holder inner surface 110. In various embodiments that will be described below, however, the holder proximal zone 150 may include at least one device securing member configured to secure an optical device such as a splitter, a fan-out body or connection, or a multiplexer, for example. The device holder 30 may also include a plurality of holder cable securing members 140a, 140b, 145a, 145b arranged around a holder periphery 180 of the device holder 30. The holder cable securing members 140a, 140b, 145a, 145b may be any structure suitable to grasp, hold, or simply facilitate guidance of optical cables toward the tray base 10 from an optical device that is secured within the holder proximal zone 150. In some embodiments the device holder 30 may include an additional securing mechanism such as holder lip 170 that may be secured into the tray base 10 such as by a snap fit, for example, to retain the device holder 30 in the holder closed position (FIG. 2).

At least one device securing member may be disposed in the holder proximal zone 150 of the holder inner surface 110 of the device holder 30. The at least one device securing member may be configured to secure an optical device to the holder inner surface 110. Various embodiments of device securing members and optical devices that may be secured to the device holder will now be described with reference to FIGS. 8A-10B.

The at least one device securing member may be configured specifically to hold a particular type of optical device. For example, referring to one embodiment shown in FIGS. 8A and 8B, the device holder 30 may include as device securing members any suitable combination of side clips 152, lateral stops 154, and an edge clip 159. Each of the device securing members may have appropriate features or contours to grasp onto or secure the particular type of optical device and may also have resilience to enable the device securing members to move or be moved laterally when the optical device is inserted or removed.

The device securing members may secure an optical device into at least one device position 155a, 155b, 155c in the holder proximal zone 150. Though in FIGS. 8A and 8B three device positions are shown, it should be readily apparent that the device securing members may be configured to secure more than three optical devices or fewer than three optical devices, as desired and depending on the widths of the optical devices being secured. The holder lip 170 may also function as an edge clip to secure at least one of the optical devices.

Figure 8A:
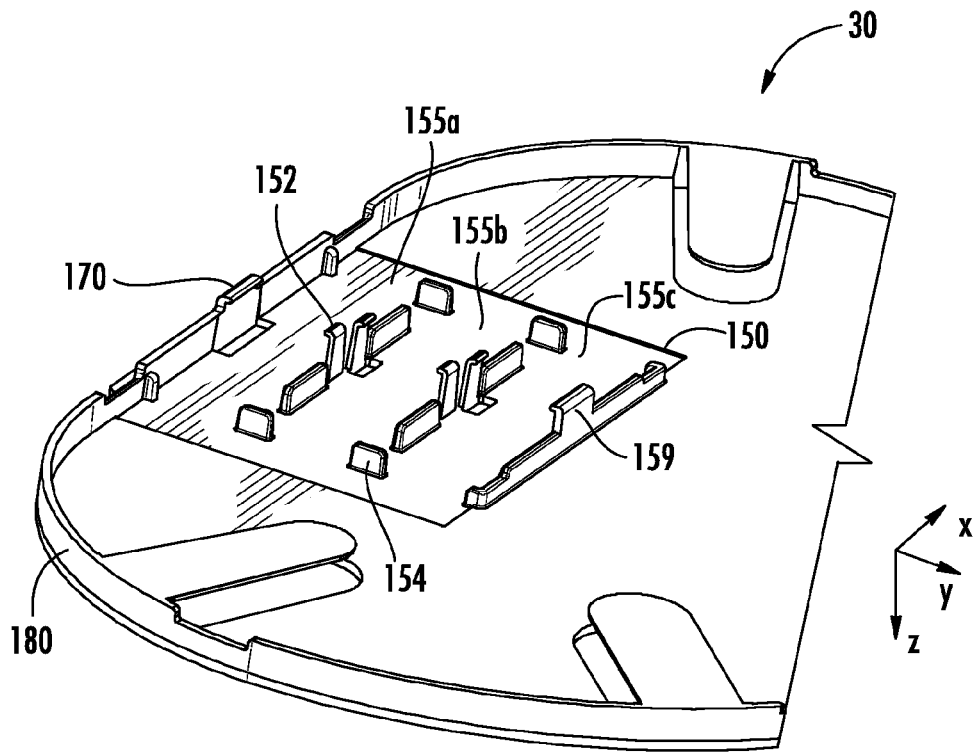
FIG. 8A is a bottom view of a device holder according to one embodiment, with device securing members configured to secure fan-out bodies.
Figure 8B:
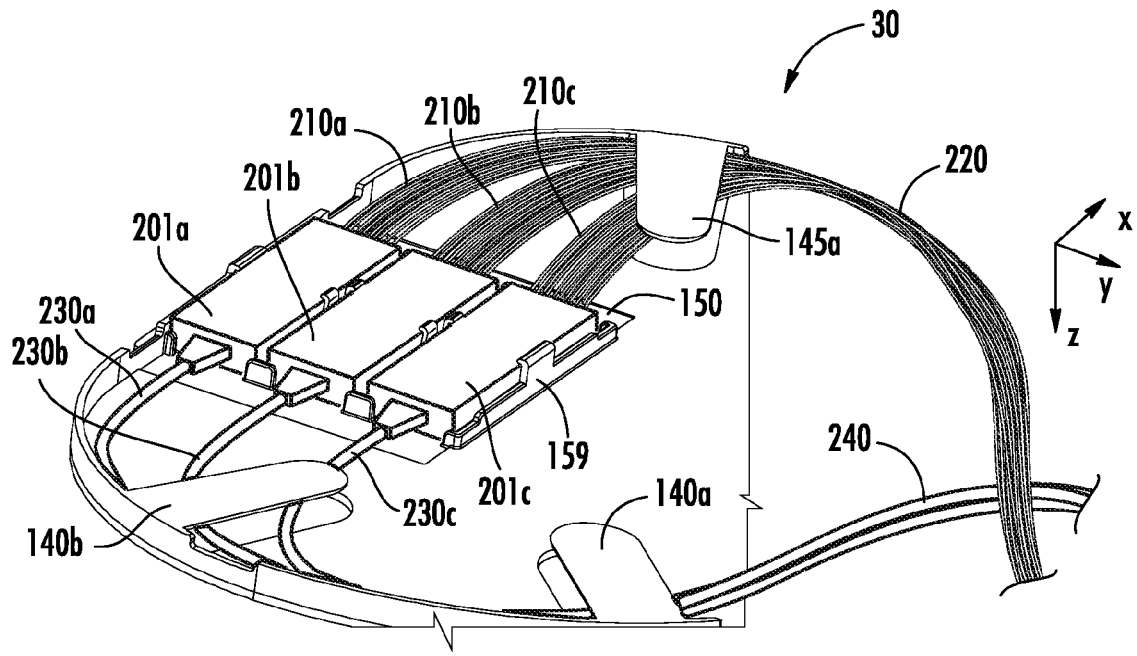
FIG. 8B is a top view of the device holder of FIG. 8A with fan-out bodies secured within the device securing members.

The device holder of FIG. 8B includes optical connectors, specifically the fan-out bodies 201a, 201b, 201c, secured to the device holder 30 having the device securing members configured as shown in FIG. 8A. The fan-out bodies establish connection between jacketed cables 230a, 230b, 230c and ribbon cables 210a, 210b, 210c. The jacketed cables 230a, 230b, 230c, may contain, for example, twelve individual strands of optical fiber in a single jacket such that all of the strands are routed together, whereas in the ribbon cables 210a, 210b, 210c each of the optical-fiber strands may be routed individually and independently. In the device holder of FIG. 8B, management of the jacketed cables 230a, 230b, 230c may be further facilitated by first holder cable securing members 140a, 140b, and management of the ribbon cables 210a, 210b, 210c may be further facilitated by second holder cable securing members 145a, 145b. Together, the jacketed cables 230a, 230b, 230c, form a first cable bundle 240, and the ribbon cables 210a, 210b, 210c form a second cable bundle 220. The terms "first cable bundle 240" and "second cable bundle 220" are intended represent only the routing of groups of individual cables passing to or from the tray base 10 toward the optical device or optical devices on the device holder 30. The individual cables of the first cable bundle 240 and the second cable bundle 220 may be, but need not be, banded or otherwise held together by a securing means such as a cable tie, for example.

Figure 9A:
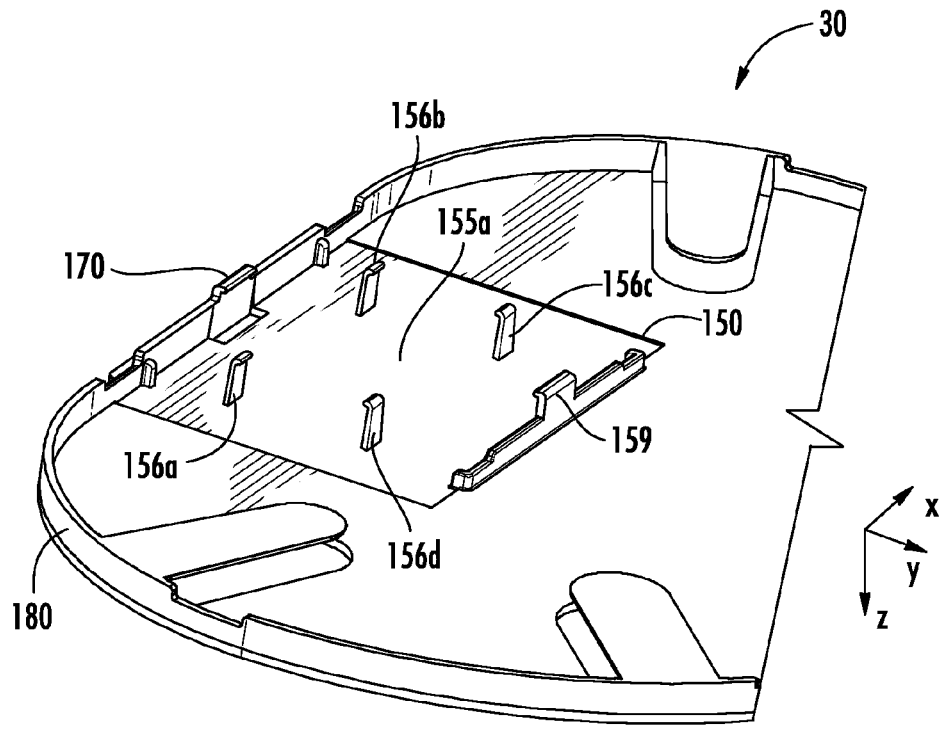
FIG. 9A is a bottom view of a device holder according to one embodiment, with device securing members configured to secure a multiplexer optical device.

Referring to FIG. 9A, in another exemplary embodiment of configurations for the at least one device securing member, the device holder 30 may include a plurality of side clips 156a, 156b, 156c, 156d in the holder proximal zone 150 as device securing members. The side clips 156a, 156b, 156c, 156d arranged as in FIG. 9A define at least one device position 155a. Though FIG. 9A shows exactly one device position 155a, it should be apparent that additional device positions may be added, based on the size of the optical device being secured. Each of the side clips 156a, 156b, 156c, 156d may be configured as hooks, for example, with a resilience that enables the side clips 156a, 156b, 156c, 156d to move when an optical device is being inserted or removed and to grasp onto the optical device once the optical device is in place.

Figure 9B:
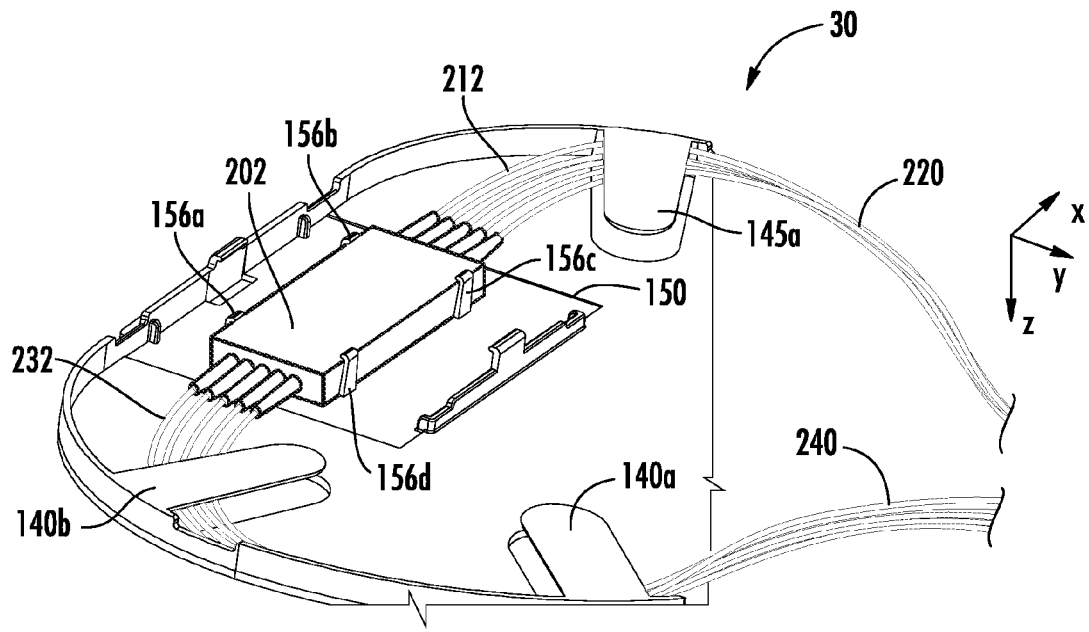
FIG. 9B is a top view of the device holder of FIG. 9A with a multiplexer optical device secured within the device securing members.

As shown in FIG. 9B, the device securing members configured as in FIG. 9A may be used to secure a multiplexer device 202 to the device holder 30. In the multiplexer device 202 as shown, an equal number of individual first cables 232 and individual second cables 212 connect to opposite sides of the multiplexer device 202. In one embodiment, the individual first cables 232 may be input cables and the individual second cables 212 may be output cables. In another embodiment, the individual first cables 232 may be output cables and the individual second cables 212 may be input cables. Though five opposing connections of a coarse wave-division multiplexer (CWDM) device are shown for the multiplexer device 202 of FIG. 9B, it should be understood that the device holder 30 and the device securing members may be configured in alternative embodiments to secure other types of optical devices or multiplexers, any of which may have fewer than five opposing connections or more than five opposing connections.

In the device holder of FIG. 9B, management of the individual first cables 232 may be further facilitated by first holder cable securing members 140a, 140b, and management of the individual second cables 212 may be further facilitated by second holder cable securing members 145a, 145b. Together, the individual first cables 232 form a first cable bundle 240, and the individual second cables 212 form a second cable bundle 220. The terms "first cable bundle 240" and "second cable bundle 220" are intended represent only the routing of groups of individual cables passing from or to the tray base 10 toward or away from the optical device or optical devices on the device holder 30. The individual cables of the first cable bundle 240 and the second cable bundle 220 may be, but need not be, banded or otherwise held together by a securing means such as a cable tie, for example.

Figure 10A:
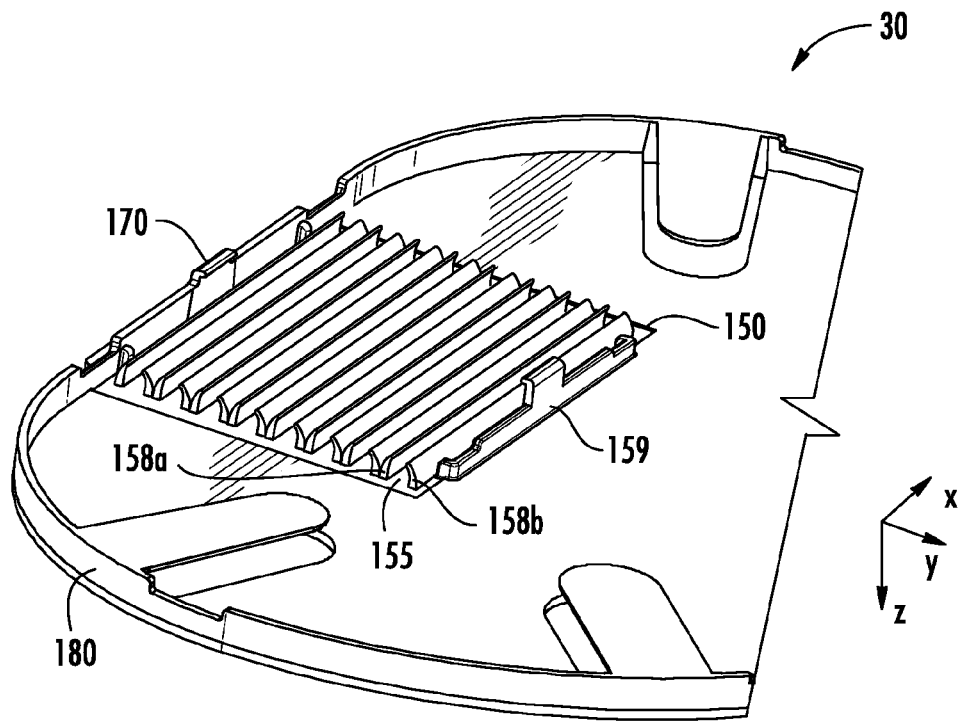
FIG. 10A is a bottom view of a device holder according to one embodiment, with device securing members configured to secure optical splitters.

Referring to FIG. 10A, in another exemplary embodiment of configurations for the at least one device securing member, the device holder 30 may include at least one pair of splitter supports such as a first splitter support 158a and a second splitter support 158b that opposes the first splitter support 158a to define at least one device position 155. Though for clarity not all splitter supports in FIG. 10A are labeled, the holder proximal zone 150 of the device holder 30 of FIG. 10A includes eight pairs of splitter supports. It should be apparent that more than eight pairs or fewer than eight pairs of splitter supports may be provided in the holder proximal zone, depending on the widths of the at least one device position 155 necessary to accommodate the optical devices to be secured in the splitter supports. Each of the opposing pairs of first splitter support 158a and second splitter support 158b may have a resilience that enables the first splitter support 158a and second splitter support 158b to move when an optical device is being inserted or removed and to grasp onto the optical device once the optical device is in place.

Figure 10B:
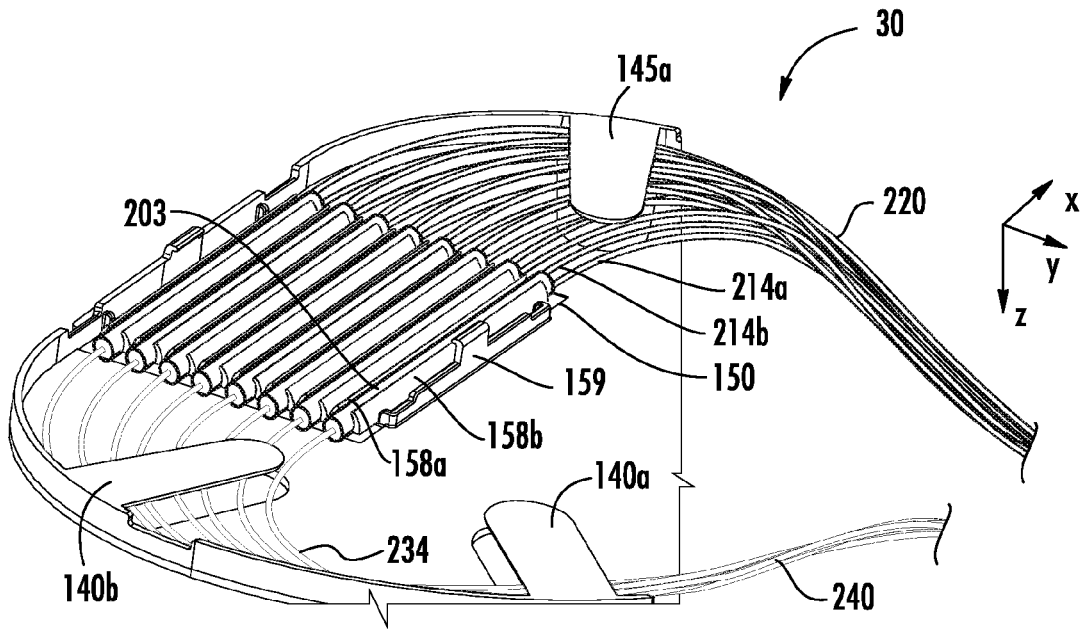
FIG. 10B is a top view of the device holder of FIG. 10A with optical splitters secured within the device securing members.

As shown in FIG. 10B, the device securing members configured as opposing pairs of a first splitter support 158a and a second splitter support 158b in FIG. 10A may be used to secure an optical splitter 203 to the device holder 30. Into each optical splitter 203 as shown, a single first cable 234 connects to one side of the optical splitter 203 and two second cables 214a, 214b connect to the opposite side of the optical splitter 203. The optical splitter 203 may produce two optical signals in the two second cables 214a, 214b from a single optical signal in the single first cable 234, for example. In other embodiments, the first splitter support 158a and the second splitter support 158b may secure optical splitters that split a single optical signal into more than two optical signals, such as three, four, or five optical signals, for example.

In the device holder of FIG. 10B, management of each single first cable 234 may be further facilitated by first holder cable securing members 140a, 140b, and management of each pair of the two second cables 214a, 214b may be further facilitated by second holder cable securing members 145a, 145b. In an alternative embodiment not shown, each single first cable 234 may be further facilitated by second holder cable securing members 145a, 145b, and management of each pair of the two second cables 214a, 214b may be further facilitated by first holder cable securing members 140a, 140b. Together, the single first cables 234 form a first cable bundle 240, and the pairs of the two second cables 214a, 214b form a second cable bundle 220. The terms "first cable bundle 240" and "second cable bundle 220" are intended represent only the routing of groups of individual cables passing from or to the tray base 10 toward or away from the optical device or optical devices on the device holder 30. The individual cables of the first cable bundle 240 and the second cable bundle 220 may be, but need not be, banded or otherwise held together by a securing means such as a cable tie, for example.

In additional embodiments, the at least one device securing member in the holder proximal zone 150 of the device holder 30 may be configured to secure a combination of optical devices such as, but not limited to, the fan-out bodies (FIG. 8B), the multiplexer (FIG. 9B), or the optical splitters (FIG. 10B). For example, the at least one device securing member may be configured to secure two fan-out bodies and three optical splitters or a multiplexer and a fan-out body.

Referring to FIGS. 2, 4, and 11, in some embodiments, when the device holder 30 is in the holder-closed position (FIG. 2) and an optical device (for example, fan-out body 201b of FIG. 11) is secured in the at least one device securing member (for example, the side clips 152 of FIG. 4) of the device holder 30, the holder distal zone 160 overlies the tray distal zone 70 and the optical device overlies the tray proximal zone 65. The optical device or optical devices secured in the holder proximal zone 150 may fit into the tray proximal zone 65 so as to allow complete closure of the device holder 30, whereby the holder lip 170 of the device holder may contact the tray base 10.

The holder-closed position is further illustrated in the cut-away view of FIG. 3A and the elevation view of FIG. 3B. As shown in FIGS. 3A and 3B, when the device holder 30 is in the holder-closed position, the holder proximal zone 150 overlies the tray proximal zone 65 and the holder distal zone 160 overlies the tray distal zone 70. Thus, when optical devices are secured into the device securing members (for example, side clips 152, edge clip 159, and holder lip 170) within device positions 155a, 155b, 155c defined by the device securing members, the optical devices also overlie the tray proximal zone 65. In some embodiments, as shown in FIG. 3B, when the device holder 30 is in the holder-closed position, and at least one optical device is secured in the device positions 155a, 155b, 155c of the device holder 30, an under-holder routing space 67 may be defined between the at least one optical device and the tray top surface 11. Such an under-holder routing space 67 may be sufficiently large to allow passage of one or more optical cables underneath the device holder 30 when the device holder 30 is in the holder-closed position. Thereby, the under-holder routing space 67 may provide additional cable-management options for the splice cassette 1 to more completely utilize available space. As exemplary of such space utilization, in FIG. 11, for example, the first cable bundle 240 routed through the tray proximal zone 65 will pass through an under-holder routing space when the device holder 30 shown in the holder-open position is moved to the holder-closed position.

A non-limiting exemplary embodiment of cable routing in a splice cassette 1 according to some embodiments described above is provided in FIG. 11. In the exemplary embodiment of FIG. 11, a splice bundle 245 enters the splice cassette 1 and is routed around the tray center portion 60 through tray cable securing members 90 within cable track 99b as first cable bundle 240. The first cable bundle 240 then passes through cable track 99a and bends toward the center cable securing member 95a and into the tray proximal zone 65. After passing through the tray proximal zone 65, the first cable bundle 240 bends back around through additional tray cable securing members 90 toward the first holder cable securing members 140a, 140b in the device holder 30.

Cables making up the first cable bundle 240 include jacketed cables 230a, 230b, 230c, which connect to fan-out bodies 201a, 201b, and 201c, respectively. On opposite ends of the fan-out bodies 201a, 201b, 201c, ribbon cables 210a, 210b, and 201c are connected. The ribbon cables 210a, 210b, 210c are guided as second cable bundle 220 through the second holder cable securing members 145a, 145b back toward the tray base 10, specifically into tray cable securing members 90 within the cable track 99a. Individual strands 225 of the ribbon cables 210a, 210b, 210c are then connected to the adapter panel 40 through connector hubs 227. The adapter panel 40 includes cable connectors 45 configured to allow connection of external devices (not shown) to the individual strands 225 of the ribbon cables 210a, 210b, 210c that are connected to the connector hubs 227. Though the routing scheme has been described illustratively as a pathway from the splice bundle 245 toward the cable connectors 45, it should be understood that the direction of optical signals through the splice cassette 1 may be in reverse (i.e., from the cable connectors 45 to the splice bundle 245) or bidirectional.

In the routing scheme of FIG. 11, the first cable bundle 240 and the second cable bundle 220 both traverse from the tray base 10 to the device holder 30 or from the device holder 30 to the tray base 10. In some embodiments, as is evident from this routing scheme, the first cable bundle 240 crosses the second cable bundle 220 at a cross point 250 between the tray base 10 and the device holder 30, regardless of whether the device holder 30 is in the holder-open position or the holder-closed position. Though in FIG. 11, the first cable bundle 240 passes underneath the second cable bundle 220 at the cross point 250 when the device holder 30 is in the holder-open position, it should be apparent that the cable bundles may be arranged such that the first cable bundle 240 instead passes over the second cable bundle at the cross point 250. The choice of which cable bundle to pass over the other cable bundle at the cross point 250 may be decided based on convenience to technical personnel who may need to install or repair connections present in the splice cassette 1. By routing the optical cables such that the first cable bundle 240 and the second cable bundle 220 cross between the tray base 10 and the device holder 30, it is believed that available space may be utilized more effectively while also avoiding tight bends to any of the optical cables. In general, optical cables by design have minimum bend radii that specify how tightly the optical cable may be bent to avoid breakage, signal loss, or signal disruption.

Thus, various embodiments of splice cassettes have been described, in which a device holder attached to a tray base may be provided to enable the securing of one or more optical devices in a manner that is both simple and can significantly increase cable capacity for high-density distributions and high fiber termination counts. Furthermore, the addition of a device holder according to the embodiments described above may increase cable storage capacity while not exceeding physical constraints of optical fibers such as minimum bending radii.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It should be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A splice cassette for optical cables and optical devices, the splice cassette comprising:
   a tray base having a tray top surface;
   a tray center portion defined on the tray top surface inside a plurality of tray cable securing members arranged around a center-portion periphery of the tray center portion, the tray center portion having a tray proximal zone and a tray distal zone defined thereon;
   a device holder hingedly attached to the tray base and having a holder-closed position and a holder-open position, the device holder comprising:
      a holder inner surface having a holder proximal zone and a holder distal zone defined thereon;
      at least one first holder cable securing member arranged around a first side of a holder periphery of the holder inner surface;
      at least one second holder cable securing member arranged around a second side of the holder periphery of the holder inner surface opposite the first side of the holder periphery; and
      at least one device securing member disposed in the holder proximal zone of the holder inner surface;
   an optical device secured to the device holder by the at least one device securing member;
   at least one first cable connected to a first side of the optical device adjacent to the first side of the holder periphery; and
   at least one second cable connected to a second side of the optical device adjacent to the second side of the holder periphery;
   wherein:
      the at least one first cable is routed from the first side of the optical device, through the at least one first holder cable securing member, to a first tray cable securing member on the tray top surface;
      the at least one second cable is routed from the second side of the optical device, through the at least one second holder cable securing member, to a second tray cable securing member on the tray top surface;

between the first holder cable securing member and the first tray cable securing member, the at least one first cable crosses the at least one second cable.

2. The splice cassette of claim 1, wherein when the device holder is in the holder-closed position and an optical device is secured in the at least one device securing member of the device holder, the holder distal zone overlies the tray distal zone and the holder proximal zone overlies the tray proximal zone.

3. The splice cassette of claim 1, wherein the at least one first cable or the at least one second cable is a ribbon cable.

4. The splice cassette of claim 1, wherein the optical device is a fan-out body and the at least one first cable or the at least one second cable is a ribbon cable.

5. The splice cassette of claim 1, wherein the optical device is a splitter that splits an optical signal in the at least one first cable into two second cables.

6. The splice cassette of claim 1, wherein the optical device is a multiplexer.

7. The splice cassette of claim 1, wherein when the device holder is in the closed position and an optical device is secured in the at least one device securing member of the device holder, a under-holder routing space is defined between the optical device and the tray top surface.

8. The splice cassette of claim 7, wherein the under-holder routing space is sufficiently large to allow a cable to pass through the under-holder routing space underneath the device holder when the device holder is in the holder-closed position.

9. The splice cassette of claim 1, further comprising a tray cover hingedly attached to the tray base and having a cover-open position and a cover-closed position.

10. The splice cassette of claim 9, wherein the device holder closes on a first axis of the tray base and the tray cover closes on a second axis of the tray base perpendicular to the first axis.

11. The splice cassette of claim 9, wherein when the device holder is in the holder-closed position and the tray cover is in the tray-closed position, the device holder is interposed between the tray top surface and the tray cover.

12. The splice cassette of claim 9, wherein the device holder and the tray cover both are made of a transparent or translucent material, such that the tray top surface is visible through the tray cover and the device holder when the device holder is in the holder-closed position and the tray cover is in the tray-closed position.

* * * * *